May 30, 1933.   W. E. GOLDSBOROUGH   1,911,499
COMBINED FUEL PUMP AND INJECTION VALVE
Filed April 19, 1926
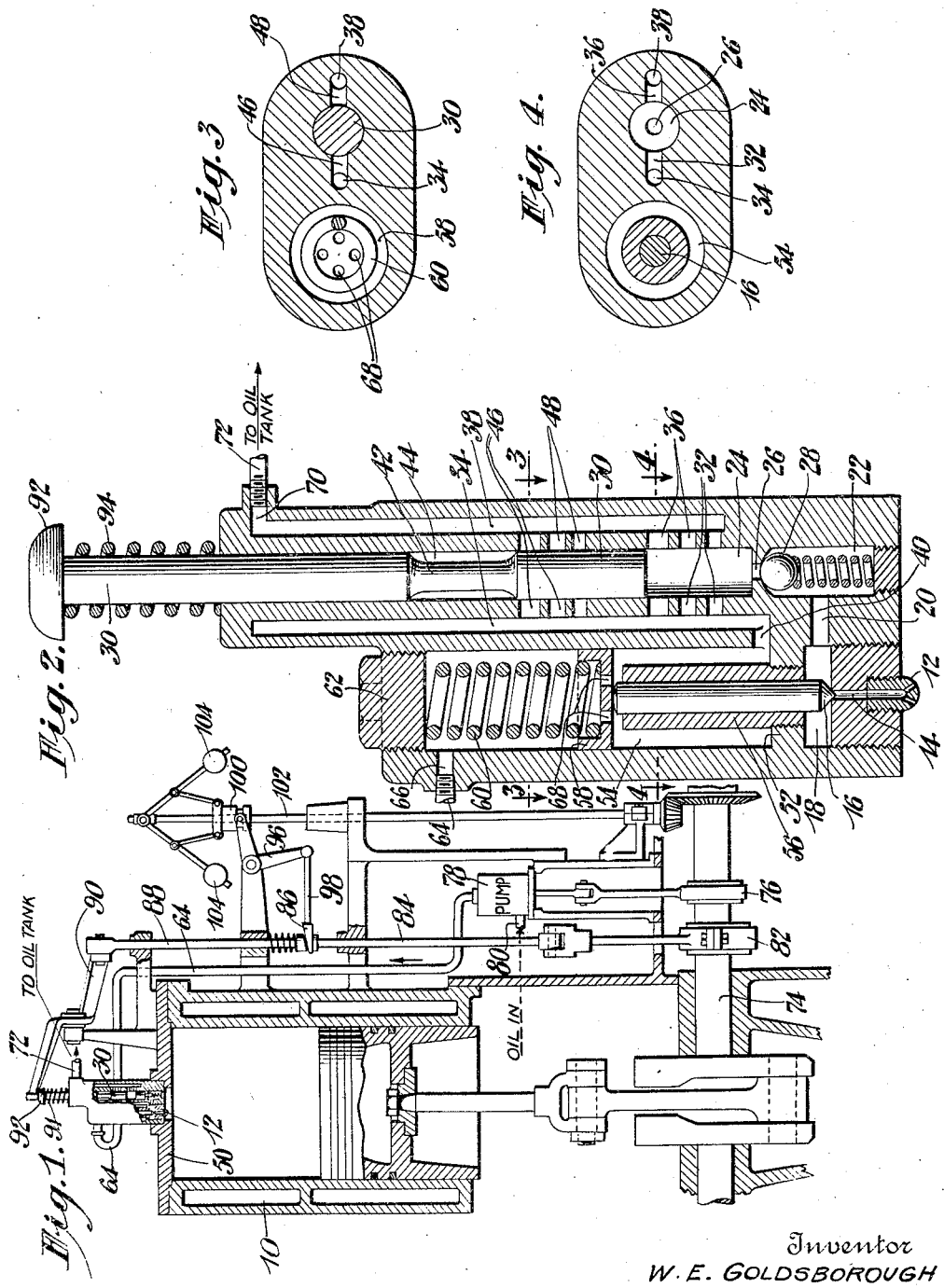
Inventor
W. E. GOLDSBOROUGH
By his Attorney
Edmund E. Borden Patented May 30, 1933

1,911,499

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

COMBINED FUEL PUMP AND INJECTION VALVE

Application filed April 19, 1926. Serial No. 102,862.

The present invention relates to the injection of liquid fuel into the working cylinders of internal combustion engines.

It has been proposed to inject fuel oil or other relatively heavy liquid fuels into the working cylinders of internal combustion engines by so-called solid injection; that is to say, without the aid of high pressure air for injection. The majority of engine builders using solid injection have placed the cylinder of the injection pump at a point comparatively far removed from the point of injection of the fuel into the cylinder and have found it necessary to develop in the oil injecting cylinder a pressure comparatively high relative to that existing in an engine cylinder during injection of the fuel. Moreover, difficulties have been encountered when using the arrangement just mentioned in that the oil remaining in the ducts adjacent the engine cylinder has become overheated in the intervals between periods of injection resulting in the formation of gas and the deposition of carbon in the ducts and in the sticking of the injection valve when first starting the engine after a shut-down.

It has been proposed also to place an injection cylinder and valve directly on the head of the working cylinder, but difficulties have been encountered with this arrangement due to overheating of the injection cylinder.

One of the objects of the present invention is to provide a method and apparatus capable of spraying heavy liquid fuel into a cylinder of internal combustion engine with high degree of atomization without difficulty due to heating of the injected fuel or the injection apparatus.

Further objects and advantages of the present invention will be evident to those skilled in the art from the following description taken in connection with the accompanying drawing in which Fig. 1 is an elevation partly in section and partly diagrammatic of an internal combustion engine equipped with fuel injection apparatus according to the present invention, parts being omitted to assist in the illustration of the novel features of the invention.

Fig. 2 is a central vertical section on an enlarged scale of the fuel injecting pump and valve also appearing in Fig. 1.

Fig. 3 is a section on the line 3—3 of Fig. 2.

Fig. 4 is a section on the line 4—4 of Fig. 2.

In the drawing, 10 indicates the power or combustion cylinder of an internal combustion engine, liquid fuel for which is injected at the proper instant in each cycle of operations through a spray cap or nozzle 12. The fuel is brought to the nozzle 12 through a duct 14 the inlet of which is controlled by a conical injection valve 16. When valve 16 is lifted from its seat at the inlet end of duct 14, liquid fuel from the chamber 18 passes into duct 14 so as to be sprayed into the cylinder 10.

Liquid fuel is supplied to the chamber 18 through a passage 20 leading from the valve chamber 22, and liquid fuel is injected into the chamber 22 from a pump cylinder 24 through a port 26. The back flow of liquid fuel from chamber 22 to the pump cylinder or chamber 24 is prevented by means of the check valve 28 covering the outlet end of the port 26. According to the present invention, a piston or plunger 30 is provided, one end of which is adapted to be thrust into the chamber 24 to trap liquid fuel therein and to force it through port 26 into chamber 22 and thence to chamber 18 under sufficient pressure to raise the injection valve 16 and to spray the fuel into the cylinder 10.

The reciprocation of the plunger 30 will, of course, create a suction effect capable of drawing liquid to the pump chamber 24 in the ordinary manner, provided suitable connections were made to a source of liquid fuel for this purpose. According to the present invention, however, means are provided whereby a flow of liquid fuel is maintained to and through the injection cylinder 24 irrespective of the reciprocation of its plunger 30. For this purpose, the walls of the cylinder 24 are provided with inlet ports 32, 32 connecting with a channel 34 in the wall of the injection apparatus, and the cylinder chamber 24 is provided also with outlet ports 36, 36 connecting with the passage 38. Liquid fuel is normally supplied to the passage 34 through a port 40 by means hereinafter described and flows through ports 32, chamber 24 and ports 36 to passageway 38. Consequently, when the plunger 30 descends, liquid is trapped in the lower portion of chamber 24 below the level of ports 32 and 36 and forced out through port 26. However, as the plunger 30 descends it necessarily cuts off the ports 32 and 36 and, unless other means were provided the flow through the channels 34 and 38 would thus necessarily be interrupted at each injection stroke of plunger 30. It is evident that the relationship of ports 32 and 34 to the plunger 30 is such that a flow of liquid through injection cylinder or chamber 24 from ports 32 to ports 36 sweeps away bubbles and floating débris from the active face of plunger 30, so that they shall not be forced into the engine cylinder or block the spray nozzle of the engine cylinder. In order to maintain a continuous flow of the liquid fuel irrespective of the position of the plunger 30, according to the present invention, the plunger 30 is cut away at the point 42 providing an annular space 44 between the upper part of the plunger and the wall of the injection apparatus. Moreover, additional ports 46, 46 and 48, 48 are provided connecting with the passages 34 and 38 respectively, whereby as the plunger 30 descends and beings to cover the ports 32 and 36 the passages 34 and 38 are put in connection with the space 44. The circulation of liquid fuel may, therefore, continue unimpeded when the plunger 30 is depressed, passing from passage 34 through ports 46 space 44 and ports 48 to the passage 38. An uninterrupted circulation of liquid fuel at normal atmospheric temperatures is provided passing through the cylinder and walls of the injection pump proper and around the injection plunger so as to abstract considerable amounts of heat from the injection cylinder and its walls and plunger. It is, therefore, permissible, according to the present invention to place the injection pump proper directly on the cover 50 of the cylinder 10 into which the injection pump is to deliver liquid fuel. It is evident, moreover, that leakage past plunger 30 is not lost, but is recovered by virtue of the fact that such leakage passes to the space 44 or to the ports 48 or 46 and so enters the stream of excess fuel and may be returned to the injection chamber 24 in a way hereinafter described. According to the present invention, moreover, the circulation of liquid fuel is utilized to cool not only the injection pump but also the injection valve. The injection pump and injection valve are so mounted and arranged with respect to each other, that this can be readily accomplished. As is illustrated more particularly in Fig. 2, the top of the chamber 18 surrounding the lower end of injection valve 16 is formed by a web 52, separating the chamber 18 from a chamber 54. The valve 16 extends upwardly through the web 52 into a chamber 54, being guided in a sleeve 56 the lower end of which is threaded into the web 52. The valve 16 extends upwardly beyond the sleeve 56 and is pressed down by a spider 58 mounted to travel in the chamber 54 and pressed down by a spring 60. The pressure of the spring 60 on the spider 58 and valve 16 may be regulated by adjusting a threaded plug 62 at the upper end of chamber 54 and against which spring 60 presses on its upward end. Oil is admitted through pipe 64 and port 66 to the upper end of chamber 54 and passes thence through the spring 60 and through apertures 68 in the spider 58 to the lower portion of the chamber 54 or that portion of this chamber below the spider 58. The liquid fuel now passes around the sleeve 56 and into contact with the web 52 cooling the sleeve 56 and valve 16 as well as the walls separating the circulating liquid fuel from the fuel trapped in the passages and chambers between the check valve 28 and the injection valve 16. The circulating liquid fuel passes out of the chamber 54 at its lower right hand end as viewed in Fig. 2 flowing out of the chamber through port 40 previously mentioned and entering the passage 34. After entering the passage 34 the circulating oil travels as previously described to the passage 38 from which latter passage it is permitted to pass out through a suitable port 70. Preferably the oil from port 70 is conducted by a pipe such as 72 to the oil tank (not shown) from which it was originally taken before being circulated through the injection apparatus as above described.

A convenient arrangement for circulating an excess of cool liquid fuel through the injection pump and valve as previously described is illustrated in Fig. 1. The engine of which cylinder 10 is a part comprises a crank shaft 74 on which is an eccentric operating an eccentric strap 76 connected by a connecting rod to the piston rod of a pump cylinder 78. During the operation of the shaft 74 the piston is reciprocated in pump cylinder 78 in the usual manner to draw oil from an oil tank (not shown) through a pipe 80. Liquid fuel entering the cylinder 78 through pipe 80 is then forced through pipe 64 previously mentioned, to the upper portion of chamber 54, through the injection apparatus and back through pipe 72 to a fuel tank. Also as illustrated in Fig. 1, means are provided for operating the injection plunger 30. This means comprises the second eccentric on shaft 74 having an eccentric strap 82 thereon. Eccentric strap 82 is connected to a reciprocating rod 84, the motion of which is transmitted through a laterally adjustable wedge 86 to a rod 88 pivoted to one end of lever 90, (through a horizontal slot). The other end of lever 90 is against the knob 92 at the upper end of the injection plunger 30. As the rod 84 is lifted by the eccentric strap 82 one end of lever 90 is also lifted and the other end of this lever is pressed down against the knob 92 thereby causing an injection stroke of the plunger 30. The return stroke of plunger 30 is caused by the spring 94 when the pressure of the lever 90 on the knob 92 has been relaxed. Furthermore, means are provided according to the present invention whereby the length of the injection stroke of the plunger 30 may be varied during the operation of the engine to which it is attached. A suitable means for the purpose just mentioned is illustrated in Fig. 1 and comprises a bell-crank 96 one end of which is pivotally connected to a rod 98 fixed to the wedge 86 previously mentioned. The other end of bell-crank 96 engages, by a pin and slot connection, the rotating collar 100 forming part of an ordinary ball governor at the upper end of the rotating shaft 102, collar 100 moving up and down on the shaft 102 in the ordinary manner in response to changes of position of the balls 104, 104 depending upon the speed of rotation of the shaft 102 which is geared to the main engine shaft 74. It will be seen that as the balls 104 fly outwardly and upwardly in response to a higher engine speed, the wedge 86 is withdrawn somewhat from between the ends of the rods 84 and 88, resulting in a shorter effective stroke of the injection plunger 30. The amount of fuel delivered to the cylinder 10 is thereby decreased and the power being thus also decreased the speed is brought back toward normal. On the other hand, if the balls 104 drop inwardly and downwardly in response to a lower engine speed, wedge 86 is thrust further between the ends of rods 84 and 88, the movement of the rod 88 being thereby compelled to more nearly equal that of rod 84 with the result that the effective injection stroke of the plunger 30 is increased and the amount of fuel injected into the cylinder 10 is increased so as to develop more power and increase the speed of the engine.

It will be seen from the foregoing that not only is the injection apparatus, according to the present invention, maintained relatively cool during the operation of the apparatus, but that the cooling action continues even when the injection plunger is inactive at either end of its stroke. An advantage incidental to the arrangement of ducts 34, 46, 48 and 38 with respect to plunger 30 according to the present invention is that any leakage past plunger 30 is recovered and automatically returned to the oil circulating in the system. Similarly oil leaking past the stem of valve 16 mixes with oil in chamber or duct 54 and is thereby recovered. Furthermore, the flow of cool liquid fuel is so arranged as to continuously remove the floating débris and air bubbles from the injection cylinder. Furthermore, any pressure created or work done by the injection plunger on one stroke is retained and utilized by the apparatus according to the present invention due to the check valve between the injection valve and the injection cylinder which holds the liquid fuel expelled from the injection cylinder under substantially the full pressure required to raise the injection valve 16. Preventing the release of pressure on oil once compressed by the injection cylinder not only economizes power, but prevents the formation of bubbles due to air or oil vapor in the space between the check valve and the injection valve. There is, therefore, a minimum of difficulty due to variations in the rate of fuel injection when using the apparatus according to the present invention, the stream of liquid flowing to the spray tip 12 being invariably solid and free from bubbles. It will be seen also that the method and apparatus according to the present invention provides for a mechanically positive but definitely variably injected volume or stroke of the injection plunger.

It will be understood that the present invention is not limited as to the cycle used in operating the engine with which the invention is employed. Consequently, no valves or valve mechanism have been shown. The arrangement of eccentric strap 82 on the main engine shaft as illustrated is that used in two cycle engines, but this showing is illustrative only and in nowise limits the invention.

Having thus described my invention, I claim:—

1. An injection apparatus comprising in combination a pump chamber having an injection plunger therein, and a forcing means for passing a stream of the liquid on which the plunger acts through said pump chamber while the plunger is at the end of its non-working stroke and for passing a stream of said liquid in cooling relation to said plunger when it is at the end of its working stroke.

2. An injection apparatus comprising in combination a pump chamber having an injection plunger therein, and a forcing means for passing a stream of liquid on which said plunger acts through said pump chamber while the plunger is at the end of its non-working stroke, said cylinder and means being so arranged that bubbles and floating débris are carried from said pump chamber.

3. An injection apparatus comprising the combination of an injection valve, an injection cylinder and plunger for delivering liquid fuel under pressure to said injection valve fuel delivering connections between said cylinder and said valve, and a forcing means for passing liquid fuel in excess of that delivered by said plunger to the back of said valve prior to entering said cylinder to thereby cool said valve.

4. An injection apparatus comprising the combination of an injection valve, an injection cylinder and plunger for delivering liquid fuel under pressure to said valve, a forcing means for maintaining a continuous flow of said fuel in excess of that required for injection through said injection valve in cooling relation to the back of the injection valve, cylinder and plunger.

5. An injection apparatus for internal combustion engines comprising an injection valve and injection cylinder mounted adjacent thereto, a pump for passing a stream of cool fluid at the back of said value and through said cylinder and a plunger in said cylinder for withdrawing fluid fuel from said stream, raising its pressure and injecting it into the engine cylinder at the front of said valve.

6. The combination in an injection apparatus of an injection plunger, a pump for maintaining a stream of liquid fuel in cooling relation to said plunger irrespective of the position of the plunger, and means whereby leakage past said plunger is recovered in said stream.

7. In the method of operating an injection apparatus having an injection valve, and a means for forcing liquid fuel to said valve under injection pressure, the steps of supplying to said forcing means liquid fuel in excess of that delivered through said injection valve and of cooling said valve and said forcing means by said excess fuel.

8. A power cylinder a fuel injector and means to circulate a stream of liquid fuel in cooling relation to said injector in combination with means for trapping portions of liquid from said stream and forcing it into said cylinder and means whereby portions of liquid trapped from said stream are held under pressure intermediate said trapping means and said cylinder.

9. The combination in an injection apparatus of a cylinder, a plunger mounted to reciprocate therein, said cylinder having apertures in its sides uncovered by said plunger when the plunger is at the end of its non-working stroke, said plunger having a reduced portion providing a space within said cylinder, said cylinder having other apertures uncovered by said reduced portion when said plunger is at the end of its working stroke, and means for flowing liquid through said apertures whenever the position of said plunger permits.

In testimony whereof I affix my signature.

WINDER E. GOLDSDBOROUGH.